(12) United States Patent
Patel et al.

(10) Patent No.: US 12,412,190 B2
(45) Date of Patent: Sep. 9, 2025

(54) SYSTEM AND METHOD FOR AUTOMATED RECOMMENDATION GENERATION FROM COMMUNICATION CONTENT AND APPLICATION THEREOF

(71) Applicant: YAHOO ASSETS LLC, Dulles, VA (US)

(72) Inventors: Umang Patel, Sunnyvale, CA (US); Kenneth Sebastian, San Jose, CA (US); Ariella Voloshin, Haifa (IL); Ariel Livshits, Haifa (IL); Ariel Raviv, Haifa (IL)

(73) Assignee: YAHOO ASSETS LLC, Dulles, VA (US)

( * ) Notice: Subject to any disclaimer, the term of this patent is extended or adjusted under 35 U.S.C. 154(b) by 0 days.

(21) Appl. No.: 18/160,782

(22) Filed: Jan. 27, 2023

(65) Prior Publication Data
US 2024/0257181 A1   Aug. 1, 2024

(51) Int. Cl.
G06Q 30/02 (2023.01)
G06Q 30/0202 (2023.01)
G06Q 30/0251 (2023.01)
G06Q 30/0601 (2023.01)

(52) U.S. Cl.
CPC ..... *G06Q 30/0255* (2013.01); *G06Q 30/0202* (2013.01); *G06Q 30/0631* (2013.01)

(58) Field of Classification Search
CPC ........... G06Q 30/0255; G06Q 30/0202; G06Q 30/0631
See application file for complete search history.

(56) References Cited

U.S. PATENT DOCUMENTS

| | | | |
|---|---|---|---|
| 2007/0088852 A1* | 4/2007 | Levkovitz | H04L 67/53 709/246 |
| 2011/0282748 A1* | 11/2011 | Ciurea | G06Q 30/0267 705/14.64 |
| 2014/0105508 A1* | 4/2014 | Arora | G06V 30/262 382/218 |
| 2015/0100416 A1* | 4/2015 | Blackhurst | G06Q 30/0253 705/14.51 |
| 2016/0063544 A1* | 3/2016 | Srivastava | G06Q 30/0267 705/14.52 |
| 2018/0211304 A1* | 7/2018 | Baxter | H04L 67/306 |
| 2020/0334706 A1* | 10/2020 | Smith | G06Q 30/0239 |
| 2021/0133160 A1* | 5/2021 | Craft | G06F 16/148 |

(Continued)

OTHER PUBLICATIONS

"Webformer: The Web-page Transformer for Structure Information Extraction" (Wang, Qifan et al. In Proceedings of the ACM Web Conference 2022 (WWW '22), Apr. 25-29, 2022, Virtual Event, Lyon, France. ACM, New York, NY, USA, 10 pages. https://doi.org/10.1145/3485447.3512032 ) (Year: 2022).*

*Primary Examiner* — James M Detweiler
(74) *Attorney, Agent, or Firm* — Venable LLP

(57) ABSTRACT

The present teaching relates to method, system, medium, and implementations for product recommendation. When communication content is received from a service provider operating on a platform, information related to a product is identified from a webpage accessed based on a link included in the communication content. Based on the information related to the product, a recommendation of the product is generated and sent to some service providers on different platforms for distribution of the recommendation to intended targets.

17 Claims, 13 Drawing Sheets

(56) References Cited

U.S. PATENT DOCUMENTS

2021/0241307 A1\* 8/2021 Pavic ................ G06N 20/00
2023/0222536 A1\* 7/2023 Hoang ................ G06N 20/20
                                                                       705/14.4

\* cited by examiner

SYSTEM AND METHOD FOR AUTOMATED RECOMMENDATION GENERATION FROM COMMUNICATION CONTENT AND APPLICATION THEREOF

BACKGROUND

1. Technical Field

The present teaching generally relates to computers. More specifically, the present teaching relates to data analytics and application thereof.

2. Technical Background

With the advancement of the Internet, much of the communication is now conducted via various platforms connected through the network. The communication not only involves interactions among family members but also that among friends and peers from social circle. In the last few decades, more than more commercial and business transactions, political activities, media broadcasts, and art performances have also been migrated to or at least started to utilize different online platforms. As such, online information is vast and swift. One of the challenges is to effectively deliver information of interest to whoever interested. Product manufacturers or service providers have adopted different ways to target users who may be interested in their products/services by, e.g., sending flyers of such products/services with emails to some targeted users. For example, when sending holiday greeting emails to users, information (e.g., promotion) about some product may be provided therewith. As another example, in sending an email related to a transaction (e.g., a confirmation email, a delivery status update email, etc.) involving a product, a seller may incorporate an advertisement of a similar product in the email to the buyer. Yet another example is to post an advertisement in a social media group, where the advertisement may be determined based on the interest of the social media group. However, the effect of such attempts is often not satisfactory because the recommended information is provided as a tagged-on information to some other communication as in some situations (e.g., attached at the end of a confirmation email) or is presented in a subordinate form as in other situations (e.g., presented in a chat room of a social group).

Thus, there is a need for a solution that addresses the challenges discussed above.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for product recommendation. When communication content is received from a service provider operating on a platform, information related to a product is identified from a webpage accessed based on a link included in the communication content. Based on the information related to the product, a recommendation of the product is generated and sent to some service providers on different platforms for distribution of the recommendation to intended targets.

In a different example, a system is disclosed for product recommendation and includes a product recommendation generator and a recommendation card distribution engine. The product recommendation generator is provided for receiving communication content from a service provider operating on a platform, identifying information related to a product from a webpage accessed based on a link included in the communication content, and generating a recommendation of the product based on the information related to the product. The recommendation card distribution engine is provided for sending the recommendation to some service providers on different platforms for distribution of the recommendation to intended targets.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for product recommendation. The information, when read by the machine, causes the machine to perform various steps. When communication content is received from a service provider operating on a platform, information related to a product is identified from a webpage accessed based on a link included in the communication content. Based on the information related to the product, a recommendation of the product is generated and sent to some service providers on different platforms for distribution of the recommendation to intended targets.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
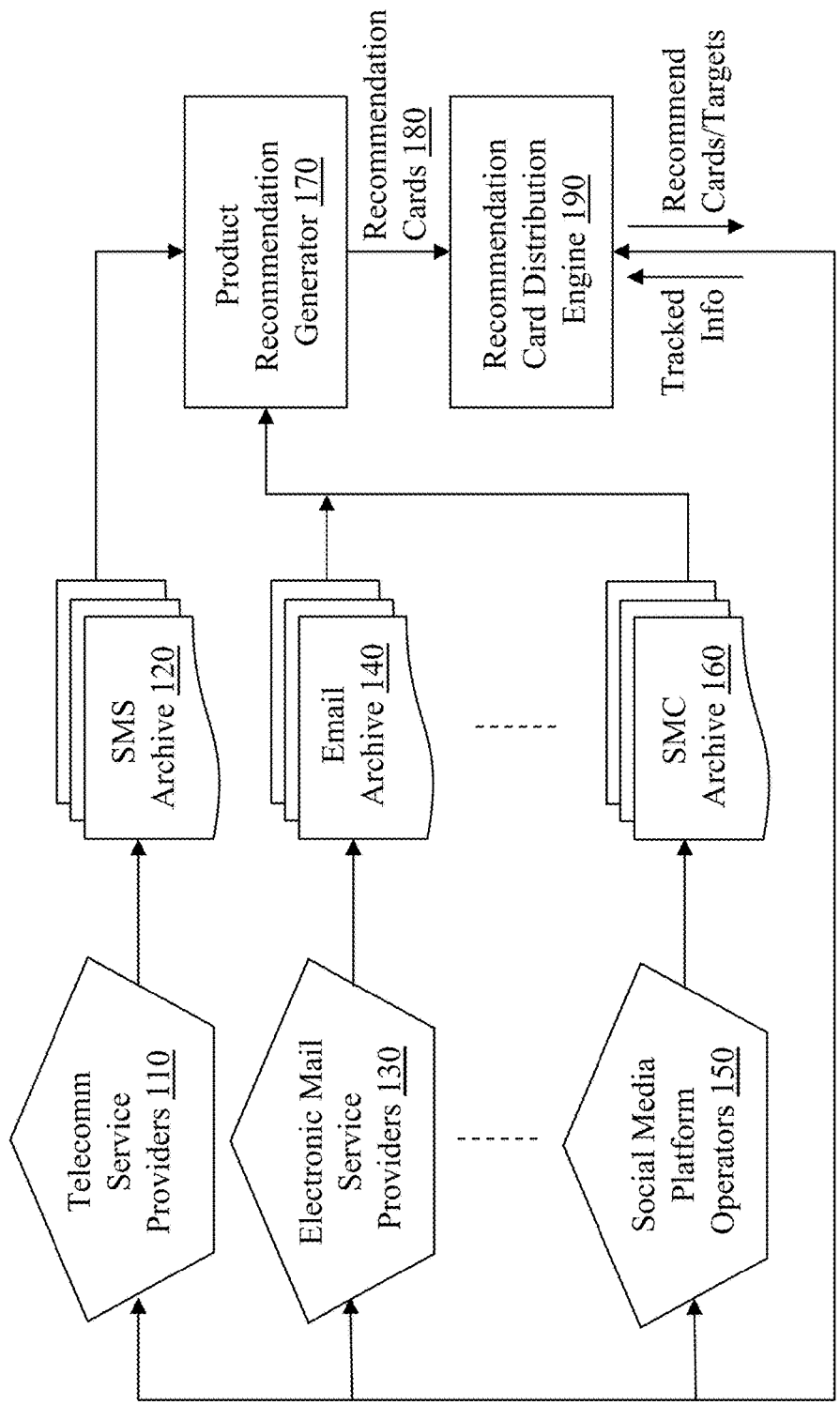
FIG. 1 depicts an exemplary high-level system diagram of a framework for automatically generating recommendations based on communication content and targeted distribution thereof, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses an exemplary framework for automatically generating recommendations based on communication content obtained from different sources and targeted distribution of such automatically generated recommendations across platforms, demographics, and interest cohorts. In some embodiments, communication content may be analyzed to focus on certain types of content. For example, emails available on a mail server may be analyzed to extract, e.g., those likely with attached product flyers. For instance, an email from a merchant to confirm a transaction or update on a delivery status may include in the end of the email a promotion flyer on a, e.g., similar product. Although such a way to promote a different is often ineffective (because most people do not read such emails or read beyond the intended message itself), it provides a source of information as to products/services that may be advertised to users. In addition, communication on social media groups or chatrooms may also offer similar sources of information on products/services that were the basis of conversations. Thus, such information may be utilized to develop a product pool, based on which recommendations of such products may be automatically generated and used for distribution to different target users.

To create a recommendation for a product, relevant content from a communication may first be identified, including a HTML structure, which is generally structured as a tree. Automated processing may be applied to identify a sub-tree in the HTML structure, localized as the scope of information related to a single product. The content represented by the sub-tree may correspond to information associated with the product such as name of the product, an image/video about the product, a coupon offered to purchase the product, and/or a pointer such as a URL to a website where additional information may be found or an order to purchase the product may be placed. That is, the sub-tree provides a localized portion of the webpage related to the product.

The textual content included in the localized portion of the webpage may then be used to generate a plurality of phrases which may be to identify a name of a product. In some embodiments, this may be carried out via classification using a model obtained via machine learning based on training data. In some embodiments, prior to the classification, the phrases may be filtered based on some predetermined criteria to remove any phrases that most likely are not corresponding to a product name. Upon a product name being identified, the HTML sub-tree may be further analyzed to locate other relevant information associated with the product. For example, a HTML tree may also include a link to an image of the product, a link to a coupon offered on the product, and a URL pointing to a website where more details of the product (e.g., description, specification, price, etc.) may be provided and where an interested user may place an order to purchase the product. In this manner, relevant information associated with the product may be automatically obtained and used to create recommendations.

In some embodiments, a recommendation related to a product may be created as a recommendation card which incorporates important and yet succinct information. Such a recommendation card may be sent to a group of users (targets) as an email so that when clicked, the card may be displayed as a, e.g., pop-up window to get the user's attention. In some embodiments, the recommendation card may also be displayed when a user signs into a, e.g., social media environment such as a chat group. In some embodiments, when a recommendation card is displayed, certain audio may also be activated to provide acoustic information related to the product.

A recommendation created according to the present teaching may be distributed in a targeted manner to users who are considered as potentially interested in the product recommended. Targeting may be performed to identify such potential users on various communication platforms, social media groups, or cohorts using targeting models that may be obtained via, e.g., machine learning, based on historic data. Such historic data may be continually collected from different platforms to provide tracked information on how responded to the recommendations previously distributed to different users. Such historic data may capture users' interests exhibited on different communication platforms, in different social media groups, or in different time frames, etc., and can be used to train targeting models.

FIG. 1 depicts an exemplary high-level system diagram of a framework 100 for automatically generating recommendations based on communication content and targeted distribution thereof, in accordance with an embodiment of the present teaching. In this illustrated embodiment, the framework 100 comprises a product recommendation generator 170 and a recommendation card distribution engine 190. The product recommendation generator 170 is configured to access archived communication content from different sources and output recommendation cards for different products generated based on the archived communication content. Such generated recommendation cards are then distributed by the recommendation card distribution engine 190 to different users active on different platforms.

Different sources of communication content may include service providers that facilitate their users to conduct online textual communications. As illustrated in FIG. 1, such service providers may include, e.g., telecommunication service providers 110 (e.g., short messages supported by Verizon, AT&T, etc.), electronic mail service providers 130 (Yahoo, Google, Microsoft, etc.), . . . , and social media platform operators 150 (such as Facebook, Twitter, etc.). Through the platforms that these service providers provide, each of them may archive the communication content created by their users on their platforms. For example, each of telecommunication service providers 110 may archive textual communication contents such as SMS messages sent and received by their users in storage 120; each of electronic mail service providers 130 may archive email communication traffics in and out of their users' inboxes in email archives 140; . . . , each of social media platform operators 150 may archive social media communication (SMC) (such as correspondences/conversations/comments/chats) created or received by their users in an SMC archive 160. Such archived communication content includes communications from merchants to their users, which usually include those related to various transactions (e.g., confirmation of orders, receipts, delivery status updates, etc.) with attached advertisement or promotions of different products. Such communication content provides the basis for recommendation generation as disclosed herein.

Service providers 110, 130, . . . , 150 may also track information about their users' activities, including the users' reactions to the communications from merchants. For example, if a merchant sends an email to a user confirming a transaction with a promotion in the end of email about another product that the merchant is selling. Some users may click on the link to the products offered and some may not. Such tracked information may be recorded and send to the recommendation card distribution engine 190 (as shown in FIG. 1) so that it may be used to learn users' interests, cohorts on different platforms, etc. to facilitate targeting when distributing the automatically generated recommendation cards. Such information tracked by different service providers may be shared with the recommendation card distribution engine 190 (in addition to the communication content archived in 120, 140, . . . , 160) to enhance the ability in targeting. In turn, the recommendation card distribution engine 190 may improve the targeting quality in the recommendation cards it generates and subsequently sends to the service providers 110, 130, . . . , 150. In this manner, the interactions between the recommendation card distribution engine 190 and service providers 110, 130, . . . , 150 may be bidirectional.

Figures 2A, 2B:
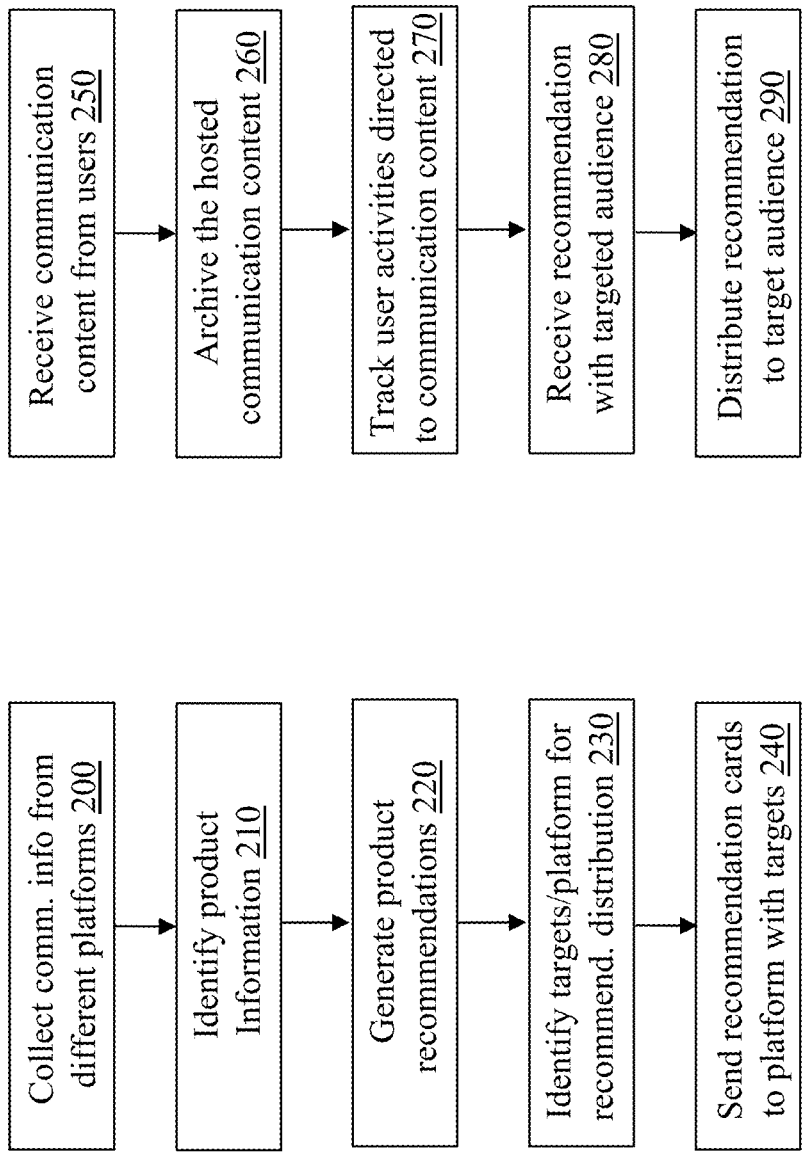
FIG. 2A is a flowchart of an exemplary process for automatically generating recommendations based on communication content and tracked information for targeting, in accordance with an embodiment of the present teaching.
FIG. 2B is a flowchart of an exemplary process of framework 100 for collecting relevant information for automatically generating recommendation cards and targeting thereof, in accordance with an embodiment of the present teaching.

FIG. 2A is a flowchart of an exemplary process directed to the part of the framework 100 for automatically generating recommendations based on communication content and tracked information for targeting, in accordance with an embodiment of the present teaching. The process of generating recommendation cards and targeting thereof involves the product recommendation generator 170 and the recommendation card distribution engine 190. In operation, the product recommendation generator 170 collects, at 200, communication content from different service platforms (120, 140, . . . , 160). From such communication content, information (e.g., emails, chats, etc.) related to different products (e.g., flyer attached to an email, an advertisement posted in a chat environment, etc.) may be identified at 210. Based on such identified information, different products may be recognized, and information associated thereof found online may be extracted to generate, at 220, recommendation cards. To distribute such generated recommendation cards, the recommendation card distribution engine 190 may receive tracked information from different platforms 110, 130, . . . , 150 and utilizing such tracked information (and other information available), the recommendation card distribution engine 190 may perform targeting with respect to the generated recommendation cards by identifying, at 230, targets and platforms for distributing the generated recommendation cards. In some embodiments, each recommendation card generated may be associated with targets on one or more platforms, according to which, the recommendation card may be sent, at 240, to the targeted platforms with specified targets to facilitate targeted distribution.

FIG. 2B is a flowchart of an exemplary process of framework 100 directed to the service providers in the framework for collecting relevant information for automatically generating recommendation cards and targeting thereof, in accordance with an embodiment of the present teaching. This exemplary process may be directed to each of the service providers 110, 130, . . . , 150. In operation, each communication service provide may receive, at 250, communication content resulted from the communications between its users and others communicating with such users. Such communication content may then be archived, at 260, in respective storages 120, 140, . . . , 160. As discussed herein, such archived communication content may be accessible to the product recommendation care generator 170 for identify products to be recommended. The service providers 110, 130, . . . , 150 may also track, at 270, activities of their users directed to the communication content, such as clicking on a promotion flyer for a product, etc. so that such tracked information may be shared with the recommendation card distribution engine 190 for targeting.

As disclosed herein, the targeting performed by recommendation card distribution engine 190 may identify, with respect to each recommendation card, a targeted group of recipients for the recommendation card. Such recipients may correspond to one or more cohorts on one or more platforms. Then recommendation cards may be sent to respective service providers on different platforms targeted with information, e.g., indicating which groups of targeted users on each different platform. When the service providers 110, 130, . . . , 150 operating on different platforms receive, at 280, the recommendation cards directed thereto with specification of targeted audience (e.g., a list of users targeted), each of the service providers distributes, at 290, the received recommendation cards to the targeted users accordingly. In distributing the recommendation cards to targeted users, the recommendation may be visualized in different ways, which will be further disclosed with reference to FIGS. 6A-7C.

Figure 3:
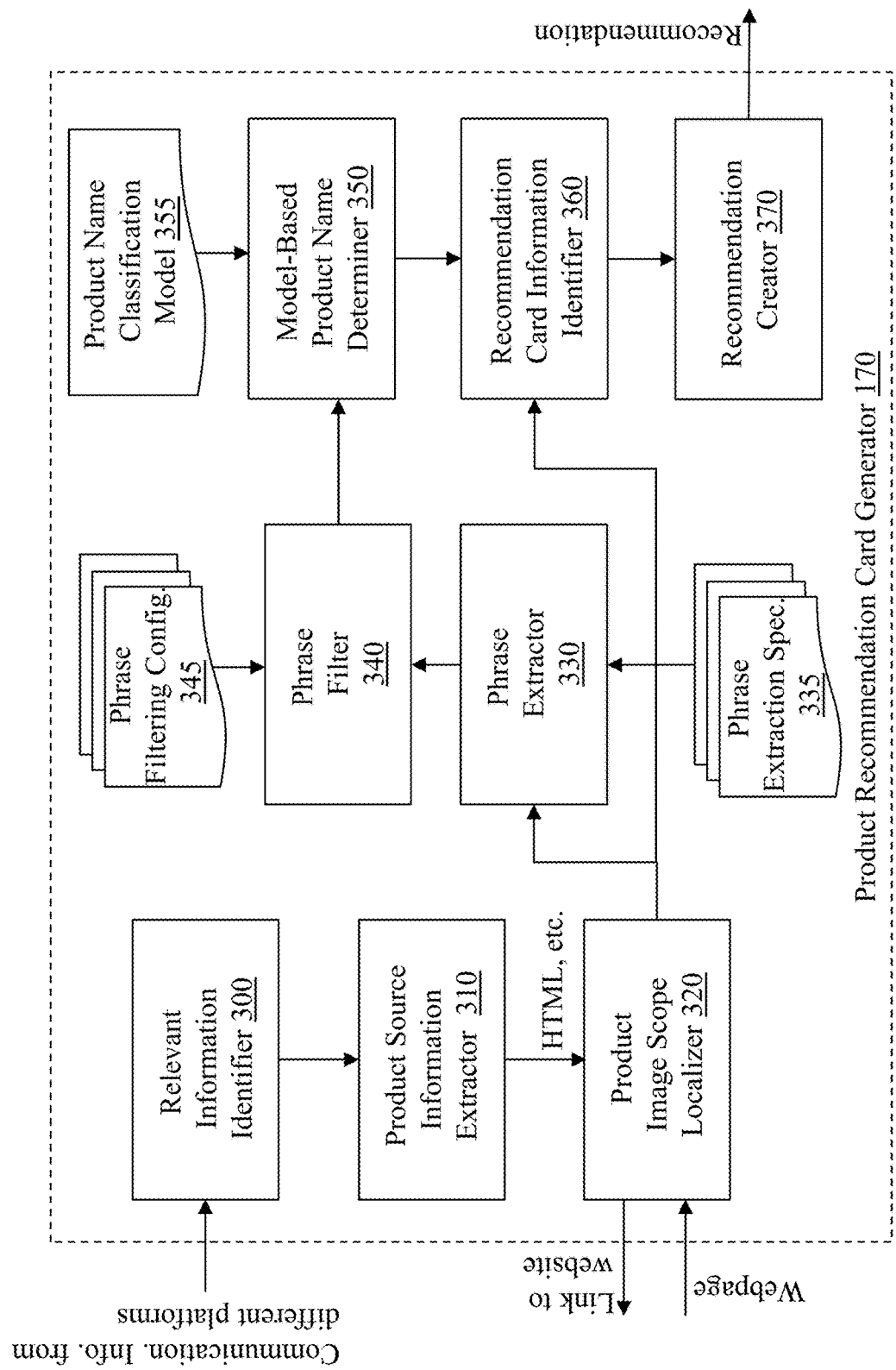
FIG. 3 depicts an exemplary high-level system diagram of a product recommendation card generator, in accordance with an embodiment of the present teaching.

FIG. 3 depicts an exemplary high-level system diagram of the product recommendation generator 170, in accordance with an embodiment of the present teaching. As discussed herein, the present teaching may identify a portion of a communication that may include information related to a product and then proceed to search online information such as a webpage to identify information needed to construct a recommendation. For example, in some embodiments, information used to construct a recommendation may include the name of a product, some visual information of the product (e.g., an image or a video clip), and a link which, when clicked, may lead to a user to a webpage with, e.g., more detailed information about the product (e.g., with specification, price, review, etc.) and the means to purchase the product.

To fulfill these functionalities, the exemplary system diagram of the product recommendation generator 170 comprises three parts, including a first part for product information scoping, a second part for product name identification, and a third part for recommendation generation. In the illustrated embodiment as shown in FIG. 3, the first part for product information scoping includes a relevant information identifier 300, a product source information extractor 310, and a product image scope localizer 320. The second part for product name identification includes a phrase extractor 330, a phrase filter 340, and a model-based product name determiner 350. The third part for recommendation generation includes a recommendation card information identifier 360 and a recommendation generator 370.

The initial input to the product recommendation generator 170 corresponds to communication content archived in storages 120, 140, . . . , 160 (FIG. 1) by different service providers 110, 130, . . . , 150. From such communication content, information that may relate to products may be identified, including a product flyer promoting a similar product in an email/message to confirm a transaction, to indicate receipt of payment, to update a shipment status, or to inform a delivery carried out, etc. Based on the initial input, online content associated with a link provided in the communication content may be accessed as input and used to perform analysis to identify product related information (e.g., name, image, etc.). The output of the recommendation card generator 170 corresponds to recommendations or recommendation cards (if recommendations are generated in a card form).

Figure 4:
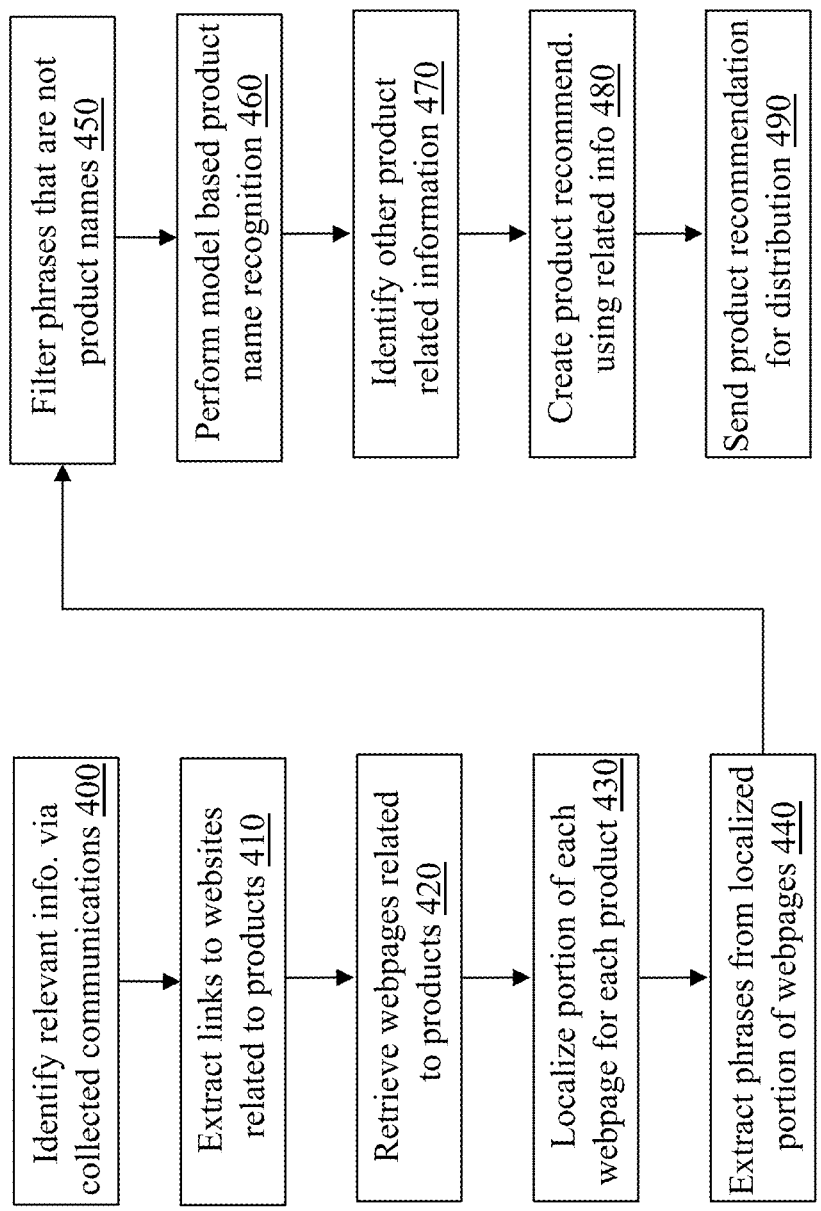
FIG. 4 is a flowchart of an exemplary process of a product recommendation card generator, in accordance with an embodiment of the present teaching.

FIG. 4 is a flowchart of an exemplary process of the product recommendation generator 170, in accordance with an embodiment of the present teaching. In this process, steps 400-430 are performed by the first part (i.e., by 300, 310, and 320); steps 440-460 are performed by the second part (i.e., by 330, 340, and 350); steps 470-490 are performed by the third part (i.e., by 360 and 370). Specifically, when the relevant information identifier 300 receives the input (communication content from different platforms), it analyzes the content to identify, at 400, information that may relate to products. As discussed herein, such relevant information may include a flyer or a promotion included in an email, a message, or a chat. The product source information extractor 310 utilizes such relevant information to extract, at 410, e.g., a link pointing to a website with some online information related to a product. For instance, a flyer about a product attached to the end of an email may include a Hypertext Markup Language (HTML) link which may be clicked to get to a webpage. This link is then used by the product image scope localizer 320 to retrieve, at 420, the webpage pointed by the link.

A webpage may present different types of content, e.g., information about the company that hosts the page (such as name, contact information, etc. of the company), tool bars for different functions that a user may invoke (e.g., a search window, online support hotline, etc.), a product manufactured or sold by the company, company locations, representative offices, advertisement from other related companies, or even company's belief statement. Because of the mixed types of content on a webpage, any information related to a product for recommendation needs to be localized. The product image scope localizer 320 is configured to localize, at 430, a portion of the webpage as related to a product. That is, a portion of the webpage associated with a product is to be localized so that information needed to generate a recommendation of the product may be identified from the localized portion. According to the present teaching, the HTML code for a webpage constructed with a tree structure may be explored to identify a sub-tree therein associated with information related to a product, because in general relevant data is closely arranged in the HTML tree.

Figure 5A:
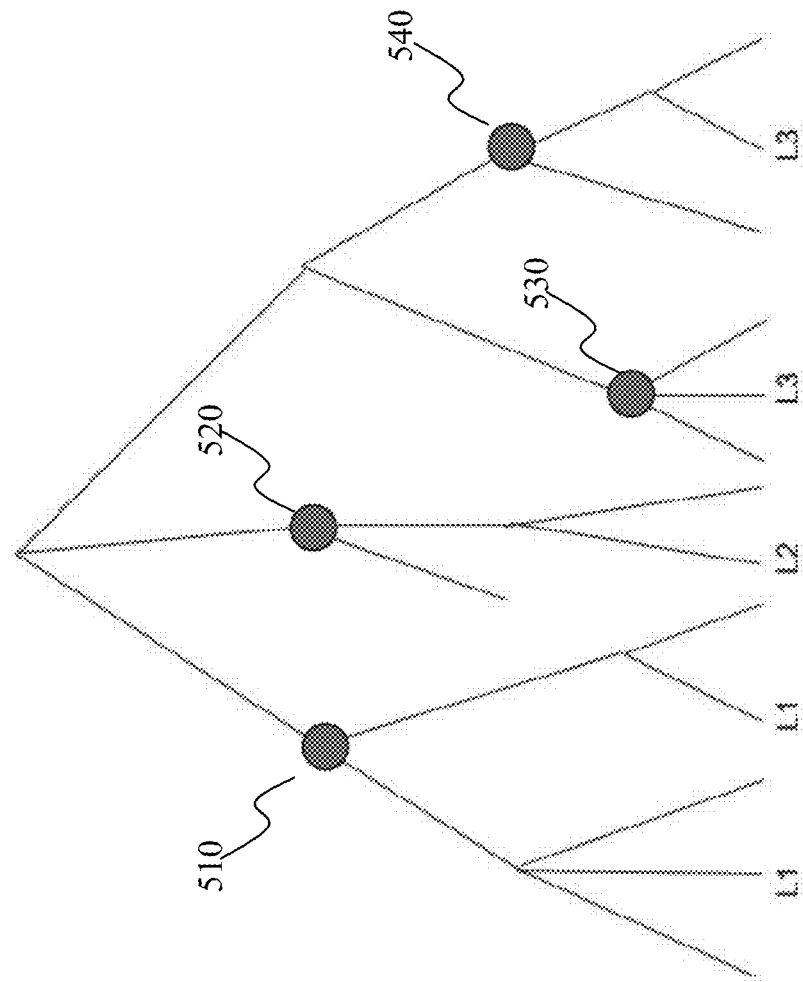
FIG. 5A illustrates an exemplary HTML tree for identifying a scope of content on a webpage related to a product, in accordance with an embodiment of the present teaching.

FIG. 5A illustrates an exemplary HTML tree 500 for identifying a scope of content on a webpage related to a product, in accordance with an embodiment of the present teaching. As seen, the exemplary HTML tree 500 has different branches at different levels. Each node from the top level corresponds to a sub-tree with all nodes branching therefrom belonging to the same sub-tree. For example, node 510 has two branches, each of which also have multiple branches, etc. All nodes originated from node 510 belong to the sub-tree represented by node 510. Similarly, all nodes originated from other exemplary nodes 520, 530, 540 belong to a sub-tree represented by a respective one of these nodes. The present teaching defines a link-based boundary in a HTML tree, which corresponds to a sub-tree identified as a highest node in the HTML tree that includes only one hyperlink. In this case, the sub-tree corresponding to the link-based boundary provides a scoped portion on the webpage (represented as a HTML tree) with content related to a single product (the hyperlink).

Based on this definition, the product image scope localizer 320 identifies each of such sub-trees from each webpage accessed using a HTML link identified from the communication content as discussed herein. Each link-based boundary represented by such a sub-tree corresponds to a portion on the underlying webpage related to the product. The identified localized portion of the webpage (defined by the link-based boundary or a sub-tree) is then sent to the phrase extractor 330. The localized portion of the webpage may include different pieces of information relevant to the product, e.g., a name, an image or video clip, or the hyperlink (e.g., an URL) and can be analyzed to identify information useful to create a recommendation.

As discussed herein, the product name may be extracted by the second part of the product recommendation generator 170, which includes the phrase extractor 330, the phrase filter 340. And the model-based product name determiner 350. In some embodiments, a product name may be identified by the phrase extractor 330, at 440, phrases from the localized portion of the webpage. In some embodiments, the phrase extractor 330 may obtain phrases from the text in the localized portion based on phrase extraction specification 335. For example, the phrase extraction specification 335 may define to extract bi-gram and 3-gram phrases. Such specification may be designed based on application needs. In some embodiments, to improve the computation efficiency, the phrases extracted from the localized portion of the webpage may be filtered to remove some unlikely candidate to reduce the number of candidate phrases to be classified.

Figure 5B:
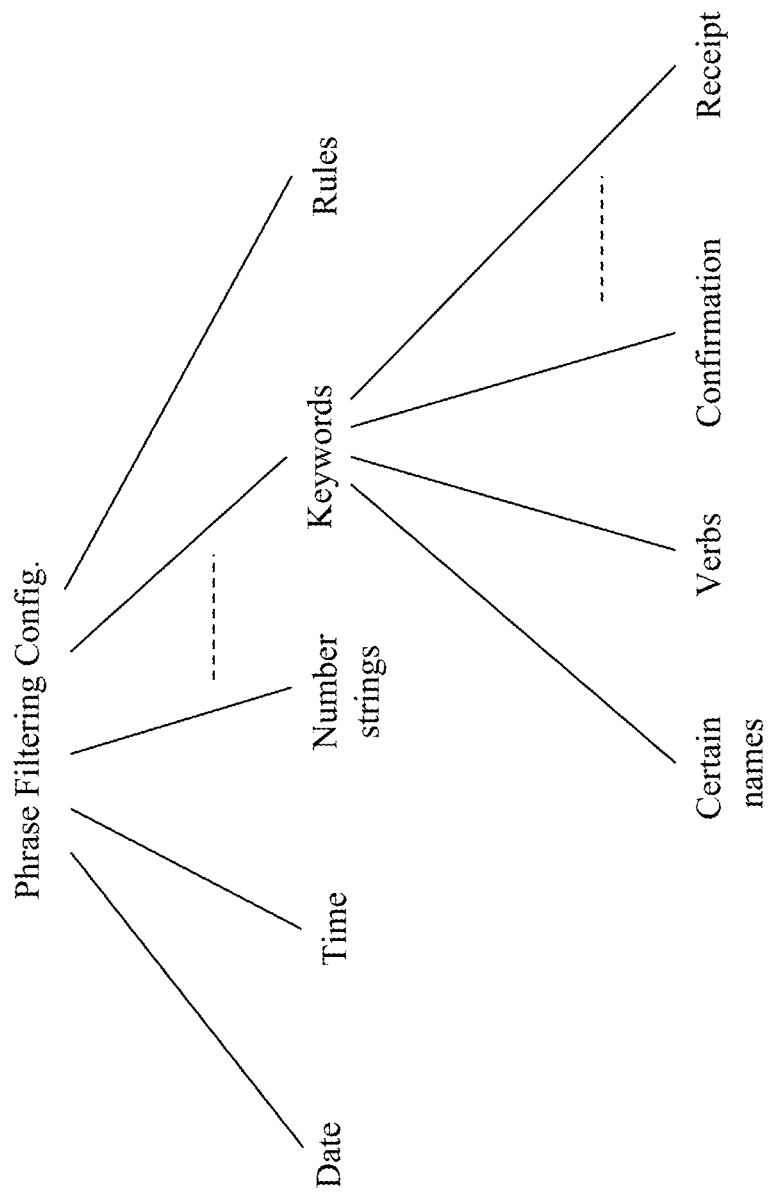
FIG. 5B shows examples of conditions for filtering out phrases not related to a product name, in accordance with an embodiment of the present teaching.

In the illustrated embodiment in FIG. 3, the phrase filter 340 may be applied to the extracted phrases to filter out, at 450, those phrases that are unlikely corresponding to a product name. In some embodiments, the filtering may be performed based on some predetermined phrase filtering configuration in 345, which may specify certain phrases that almost certainly do not correspond to a product name. FIG. 5B shows example types of phrases specified to filter out phrases not related to a product name, in accordance with an embodiment of the present teaching. As illustrated, phrases that generally are not a product name may include, e.g., text corresponding to a date, time, numbers (only), certain names such as typical first/last/city/state/country names, certain words such as verbs, "confirmation," . . . , "receipt," etc. In some embodiments, some filtering conditions may be specified as rules, which may be determined based on application needs.

Upon filtering, some phrases may be removed, and the remaining phrases may then be classified, which may yield, with respect to each phrase, a probability representing a likelihood as to whether the phrase is a product name. In the illustrated embodiment as shown in FIG. 3, the classification may be performed, at 460, by the model-based product name determiner 350 based on a trained product name classification model 355. In some embodiments, a phrase that has the highest probability may be selected as the product name. Such a determined product name may then be used to generate a recommendation. As discussed herein, this is performed by the third part of the product recommendation generator 170, which includes the recommendation car information identifier 360 and the recommendation generator 370.

A recommendation (or a recommendation card) for a product may include some important pieces of information about the product, in addition to the name of the product. For instance, a recommendation may also include some visual information about the product, which may be an image or a video clip that visually presents the product. In addition, a link to an online location where more detailed information about the product with a means to, e.g., purchase the product may also be included in the recommendation. To obtain such relevant information, the recommendation card information identifier 360 identifies, at 470, the needed information to be included in the recommendation from, e.g., the localized portion of the webpage. In this case, the sub-tree defined via the link-based boundary may be searches to identify relevant information associated with the product. Such extracted additional information related to the product is then sent to the recommendation generator 370 to create a recommendation.

Upon receiving the information related to the product, the recommendation creator 370 creates, at 480, a product recommendation accordingly and sends, at 490, the recommendation to the recommendation card distribution engine 190 (see FIG. 1). As discussed herein, a created recommendation may be provided to different service providers 110, 130, . . . , 150 operating on different platforms for distributing to their respective users. In some embodiments, the distribution of a product recommendation may be targeted, and the targeting may be performed by the recommendation card distribution engine 190. In some embodiments, targeting may be performed for each recommendation with respect to each of the service providers on different platforms. For example, a recommendation may be used to target users via emails (through electronic mail service providers 130), via short messages (through telecom service providers 110), . . . , or via social media group chats (through social media operators 150). In some embodiments, with respect to a service provider on each platform, a cohort may be targeted for distribution and information related to cohort may be provided to each service provider on different platforms.

Information about different cohorts on different platforms may be established based on continuously received tracked information, received by the recommendation card distribution engine 190 from different platforms. Databases may be created to store information continually collected to record demographics and preferences of users active in respective services offered by different service providers on different platforms. In some embodiments, the demographics/preferences of users may be updated based on dynamic data collected to adapt to the users. Cohorts may then be recognized based on known demographics/preferences of users. The cohorts may be formed either collectively or separately with respect to different platforms.

During targeting, for each of the recommendations, a group of targets may be identified with respect to each platform so that the recommendation may be sent to each platform with a specified group of targets to whom the recommendation is to be distributed. Each target may be an individual, a group of users, a cohort, or a group of cohorts. In some embodiments, the targeted users may include the user whose communication content (e.g., an email with a promotion flyer attached to the end) is used to generate the recommendation.

Figure 6A:
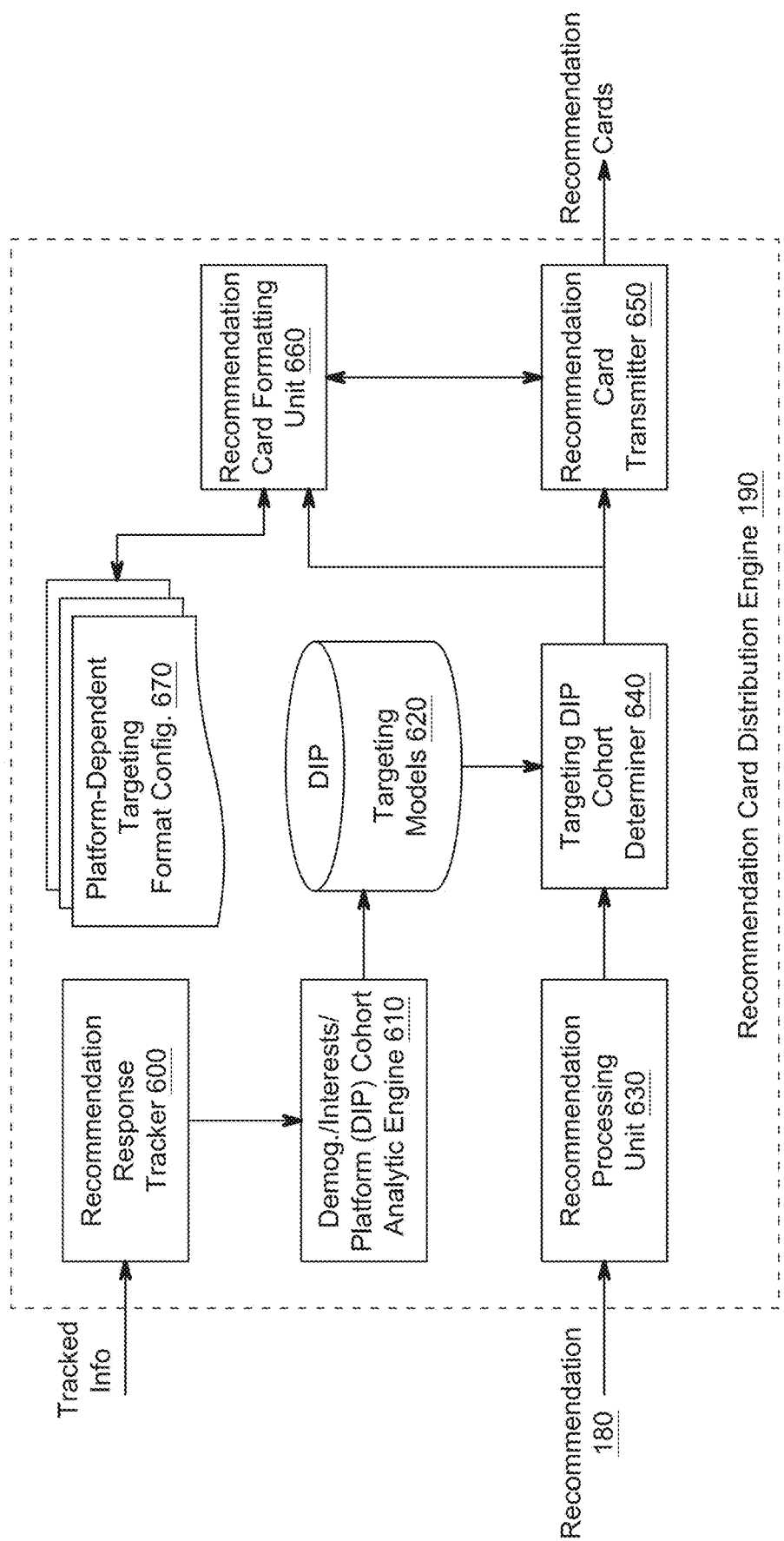
FIG. 6A depicts an exemplary high-level system diagram of a recommendation card distribution engine, in accordance with an embodiment of the present teaching.

FIG. 6A depicts an exemplary high-level system diagram of the recommendation card distribution engine 190, in accordance with an embodiment of the present teaching. In this illustrated embodiment, the recommendation card distribution engine 190 may include a frontend part and a backend part. The backend part may be provided for continuously analyzing tracked information received from different platforms in order to update a demographics/interests/platform (DIP) targeting models 620 so that the front end may utilize it to determine targets/cohorts with respect to each recommendation. In this illustrated embodiment, the backend part may include a recommendation response tracker 600 and a DIP cohort analytic engine 610. The frontend part of the recommendation distribution engine 190 may be provided to carry out targeting, based on the DIP targeting models 620, to identify audience for each of recommendation and transmit the recommendation to the targeted audience at one or more platforms with, e.g., targeting instructions to distribute the recommendation to the identified audience. In this illustrated embodiment, the frontend part may include a recommendation processing unit 630, a targeting DIP cohort determiner 640, a recommendation card formatting unit 660, and a recommendation card transmitter 650.

Figures 6B, 6C:
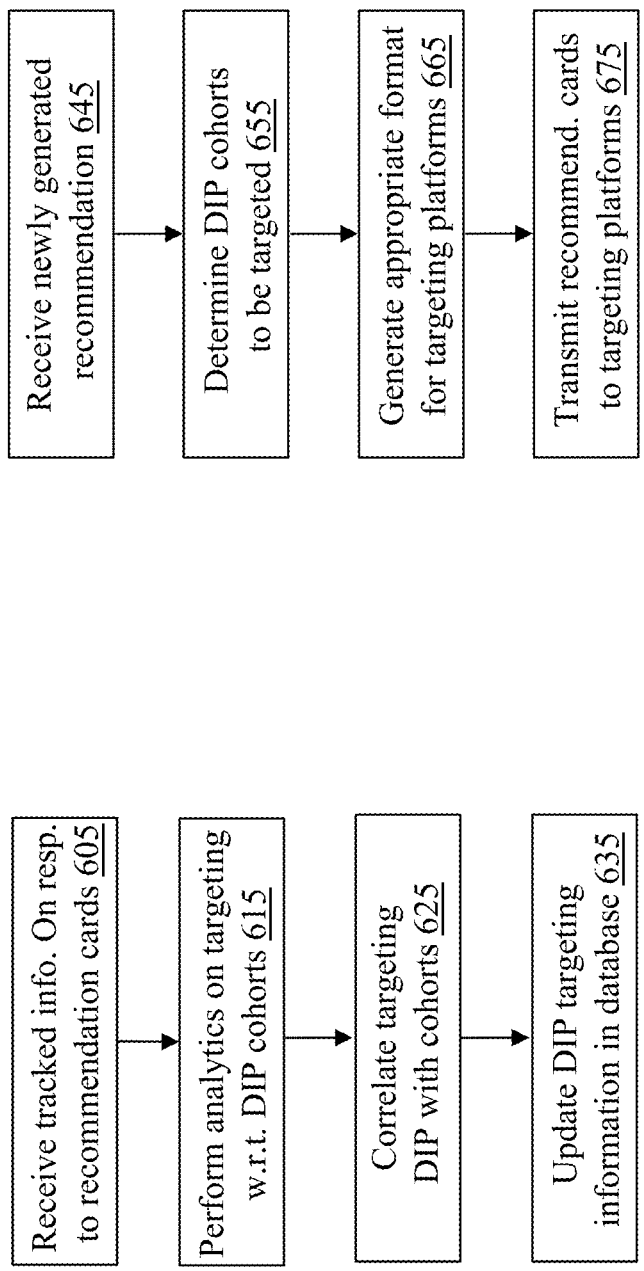
FIG. 6B is a flowchart of an exemplary process of learning targeting models of a recommendation card distribution engine, in accordance with an embodiment of the present teaching.
FIG. 6C is a flowchart of an exemplary process of distributing generated recommendation cards based on targeting models, in accordance with an embodiment of the present teaching.

FIG. 6B is a flowchart of an exemplary process of the backend part of the recommendation card distribution engine 190, in accordance with an embodiment of the present teaching. As disclosed herein, the backend part is for learning the DIP targeting models 620 based on the tracked information from different platforms. In operation, when the recommendation response tracker 600 receives, at 605, the tracked information from the platforms, it may preprocess the tracked information to, e.g., organize the received information to position for further analysis. For instance, while it may receive tracked information from different platforms on a continuous basis, it may organize the received information in accordance with some criteria, which can be with respect to platforms, services, previously distributed recommendations, user groups (e.g., chat groups), and/or individual users. The preprocessed information may then be sent to the DIP cohort analytic engine 610 for further processing to identify cohorts with respect to different criteria.

Upon receiving the preprocessed information, the DIP cohort analytic engine 610 may proceed to perform analysis, at 615, in order to establish the DIP targeting models 620. In some embodiments, the analysis may link tracked activity information of different users to demographics/interests/platforms (DIPs) to obtain data that may further be used to identify correlation, at 625, between cohorts and DIPs. The correlation may then be further utilized to update the DIP targeting models at 635. This process is continuous so that the dynamically tracked information received from different platforms may be used to adapt the DIP targeting models 620 to the real time situations. The updated DIP targeting models 620 may be accessed at any time in operation to carry out the targeting for any received recommendation for a product in order to maximize the effectiveness of the recommendations.

FIG. 6C is a flowchart of an exemplary process of the frontend part of the recommendation card distribution engine 190, in accordance with an embodiment of the present teaching. As discussed herein, the frontend part is for model-based targeting and distribution of recommendations. In some embodiments, distributing a recommendation to intended audience may involve generating recommendation cards suitable for different platforms and distributing the recommendation cards to different platforms in accordance with the targeted audience information. In operation, when the recommendation processing unit 630 receives, at 645, recommendations (created by the product recommendation generator 170), it may process the recommendations by, e.g., queuing them in a list so that each recommendation may be used for targeting separately. The targeting DIP cohort determiner 640 may then, with respect to each of the recommendations queued in the list, determine one or more DIP cohorts with respect to each of the platforms based on the DIP targeting models 620.

Once the targeted cohorts are identified, the recommendation card formatting unit 660 may generate, at 665, recommendation cards to be distributed to different platforms in accordance with a form appropriate to each of the targeted platforms. For instance, for a recommendation to be distributed to target audience in both emails and short messages, the corresponding recommendation cards to be sent to these two different platforms may be formatted differently. In some embodiments, the format appropriate for each platform may be specified in a platform-dependent targeting format configuration archived in 670 and accessed by the recommendation card formatting unit 660 to generate appropriate recommendation cards for targeted audience. Such generated recommendation cards directed to different platforms may then be sent to the recommendation card transmitter 650, which may then transmit, at 675, the recommendation cards to corresponding platforms with targeting instructions which may indicate, e.g., the cohort(s) or individual users targeted on each platform.

Figure 7A:
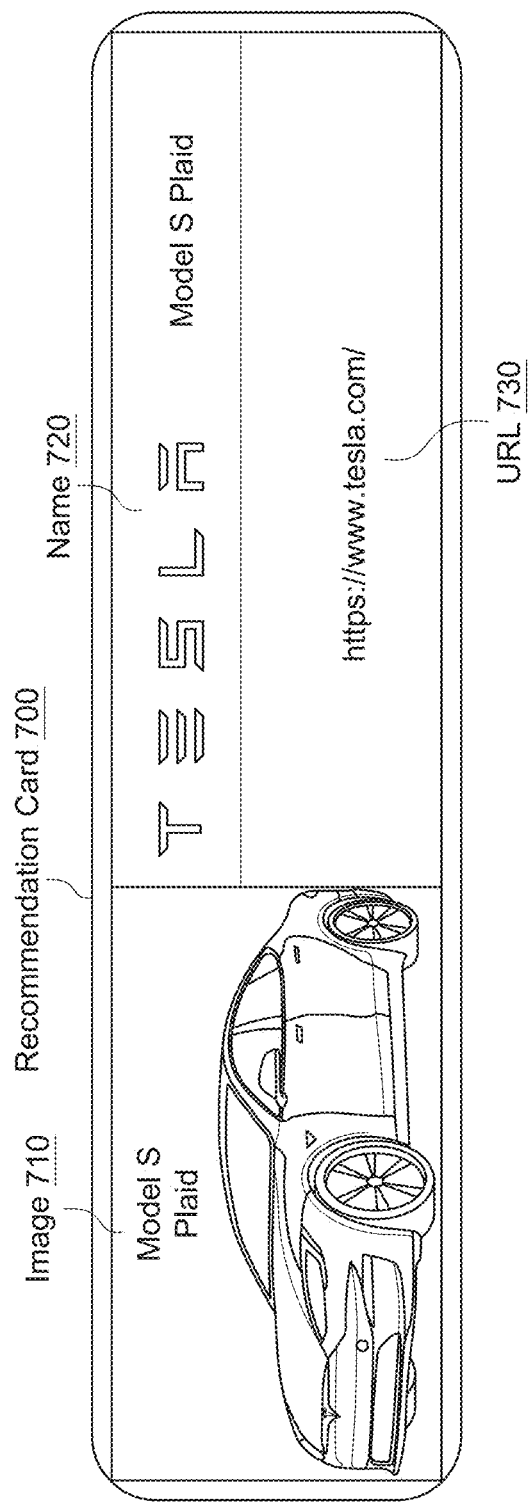
FIG. 7A shows an exemplary structure of a recommendation card automatically generated based on communication content, in accordance with an embodiment of the present teaching.

In some embodiments, a recommendation card may include multiple pieces of information such as a name of the product, a visual presentation of the product which may be an image or a video clip, and a clickable or actionable link that, once clicked by a user, may take the user to a webpage where detailed information about the product is provided (e.g., a specification of the product, a video clip to show its use or installation, price, reviews, other companion products, etc.), and where an interested user may make a purchase. FIG. 7A shows an exemplary structure of a recommendation card automatically generated based on communication content, in accordance with an embodiment of the present teaching. As shown in this example, the recommendation card is about Tesla's Model S Plaid vehicle, constructed with succinct yet the most essential information included therein. As shown, the exemplary recommendation card 700 appears like a flyer with a name of the product 720, a photo of the product 710, and an URL 730 that an interested user may click to get on Tesla's website. It is noted that although a recommendation in the exemplary disclosure is formatted and to be distributed as a recommendation card, it is merely for an illustration. It is not intended as a limitation to the scope of the present teaching. A recommendation generated in accordance with the present teaching may be in any other form and may be distributed and delivered in any format.

Figure 7B:
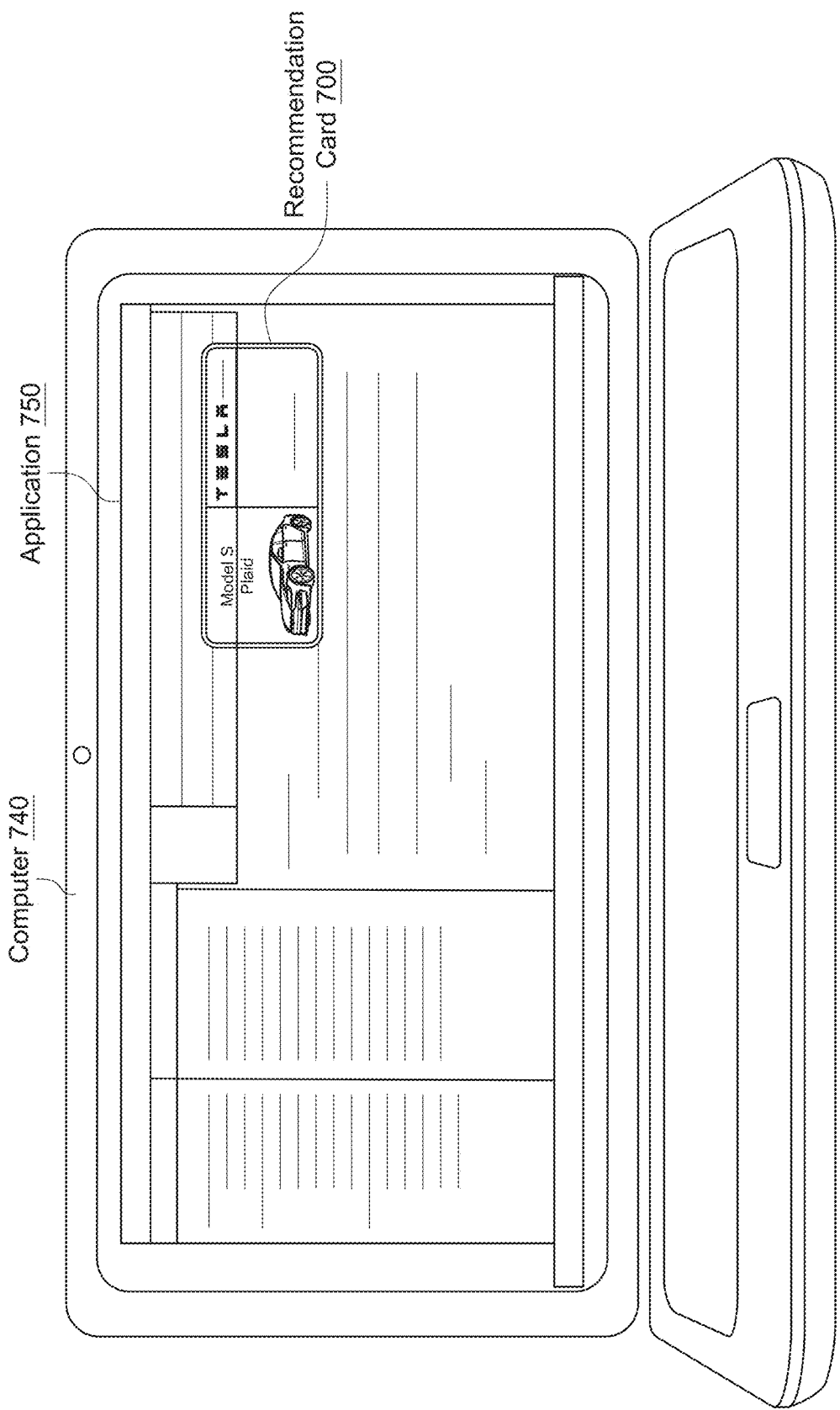
FIG. 7B shows an exemplary pop-up display of a recommendation card automatically generated based on communication content, in accordance with an embodiment of the present teaching.

The recommendation cards, once received by a respective platform, may be delivered in different ways to the targeted audience identified during targeting. For example, in some embodiments, a recommendation card may be delivered as a pop-up display window, as shown in FIG. 7B, where on a computer 740, when certain application 750 is accessed, e.g., an Inbox of an electronic mail system, a recommendation card is popped up with a recommendation card 700 displayed therein. The pop-up window may be located in a location where the blocking of the application content may be minimized.

Figure 7C:
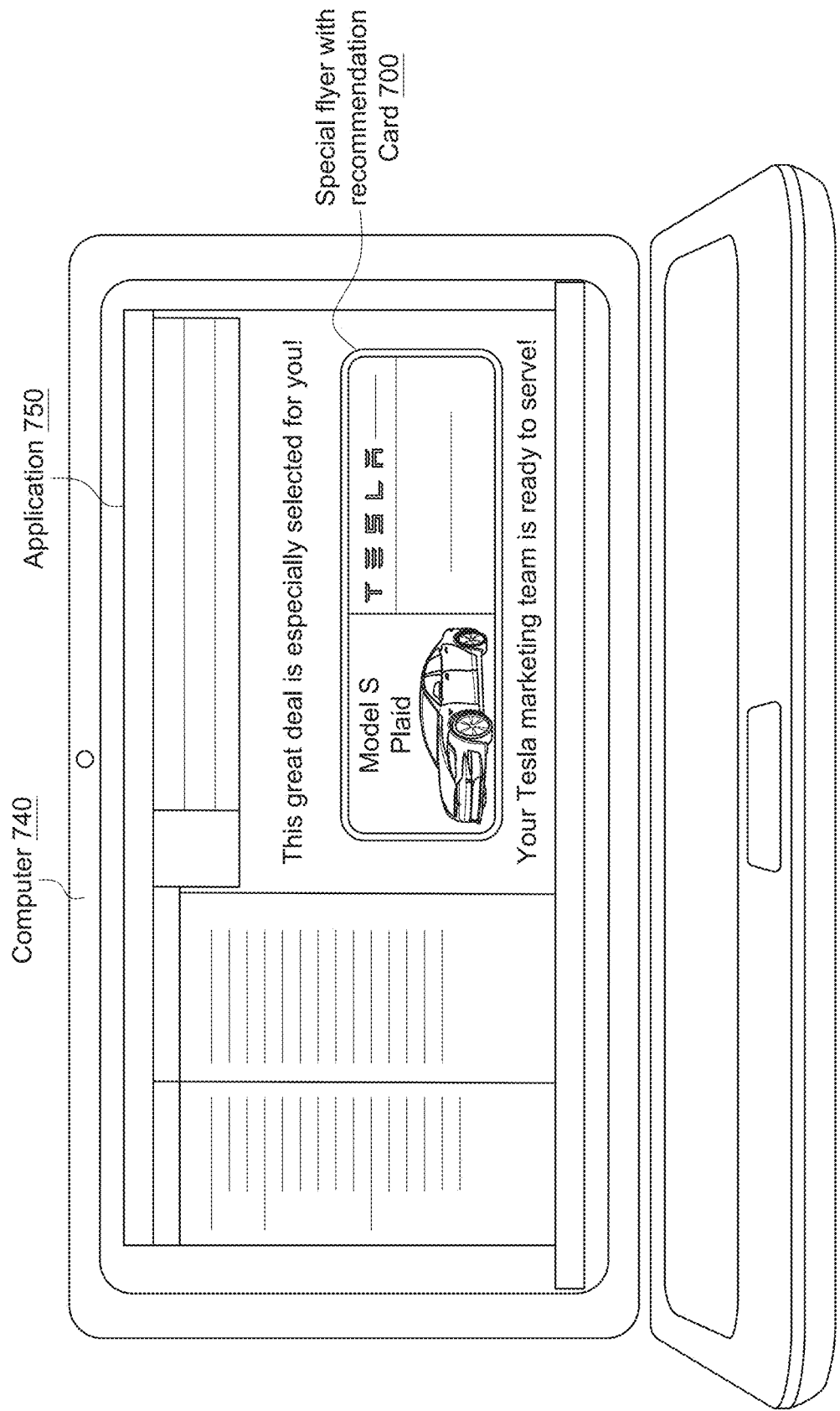
FIG. 7C shows a different exemplary way to present a recommendation generated automatically based on communication content, in accordance with an embodiment of the present teaching.

FIG. 7C shows a different exemplary way to present a recommendation generated automatically based on communication content, in accordance with an embodiment of the present teaching. In this example, a recommendation card 760 may be delivered as a flyer appearing within the body of an application (e.g., an electronic mail) with some accompany text around the flyer provided to attract the attention of a user. These delivery approaches may be used to introduce some degree of disruption to the normal operation to get a user's attention. As such a recommendation includes only limited yet essential information without needing to read text, a brief glance may allow a user to quickly capture the message to be delivered.

Figure 8:
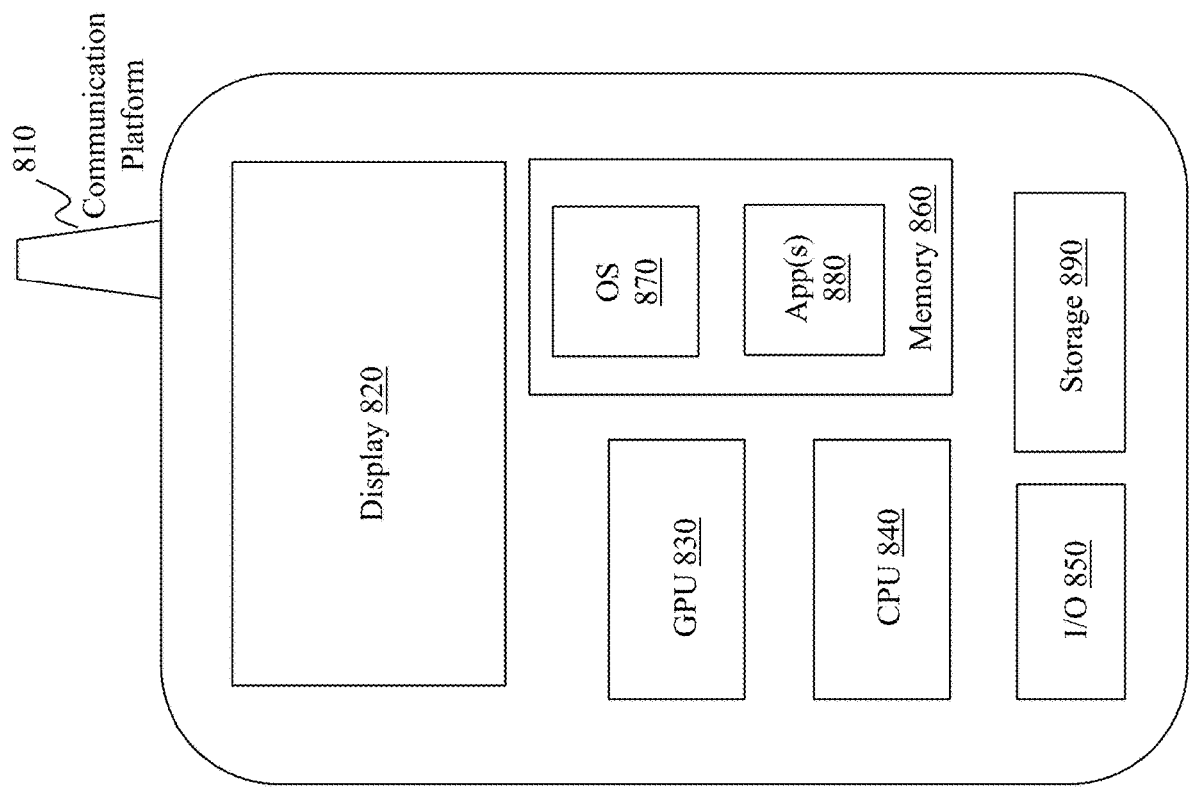
FIG. 8 is an illustrative diagram of an exemplary mobile device architecture that may be used to realize a specialized system implementing the present teaching in accordance with various embodiments.

FIG. 8 is an illustrative diagram of an exemplary mobile device architecture that may be used to realize a specialized system implementing the present teaching in accordance with various embodiments. In this example, the user device on which the present teaching may be implemented corresponds to a mobile device 800, including, but not limited to, a smart phone, a tablet, a music player, a handled gaming console, a global positioning system (GPS) receiver, and a wearable computing device, or in any other form factor. Mobile device 800 may include one or more central processing units ("CPUs") 840, one or more graphic processing units ("GPUs") 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870 (e.g., iOS, Android, Windows Phone, etc.), and one or more applications 880 may be loaded into memory 860 from storage 890 in order to be executed by the CPU 840. The applications 880 may include a user interface or any other suitable mobile apps for information analytics and management according to the present teaching on, at least partially, the mobile device 800.

User interactions, if any, may be achieved via the I/O devices 850 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 9:
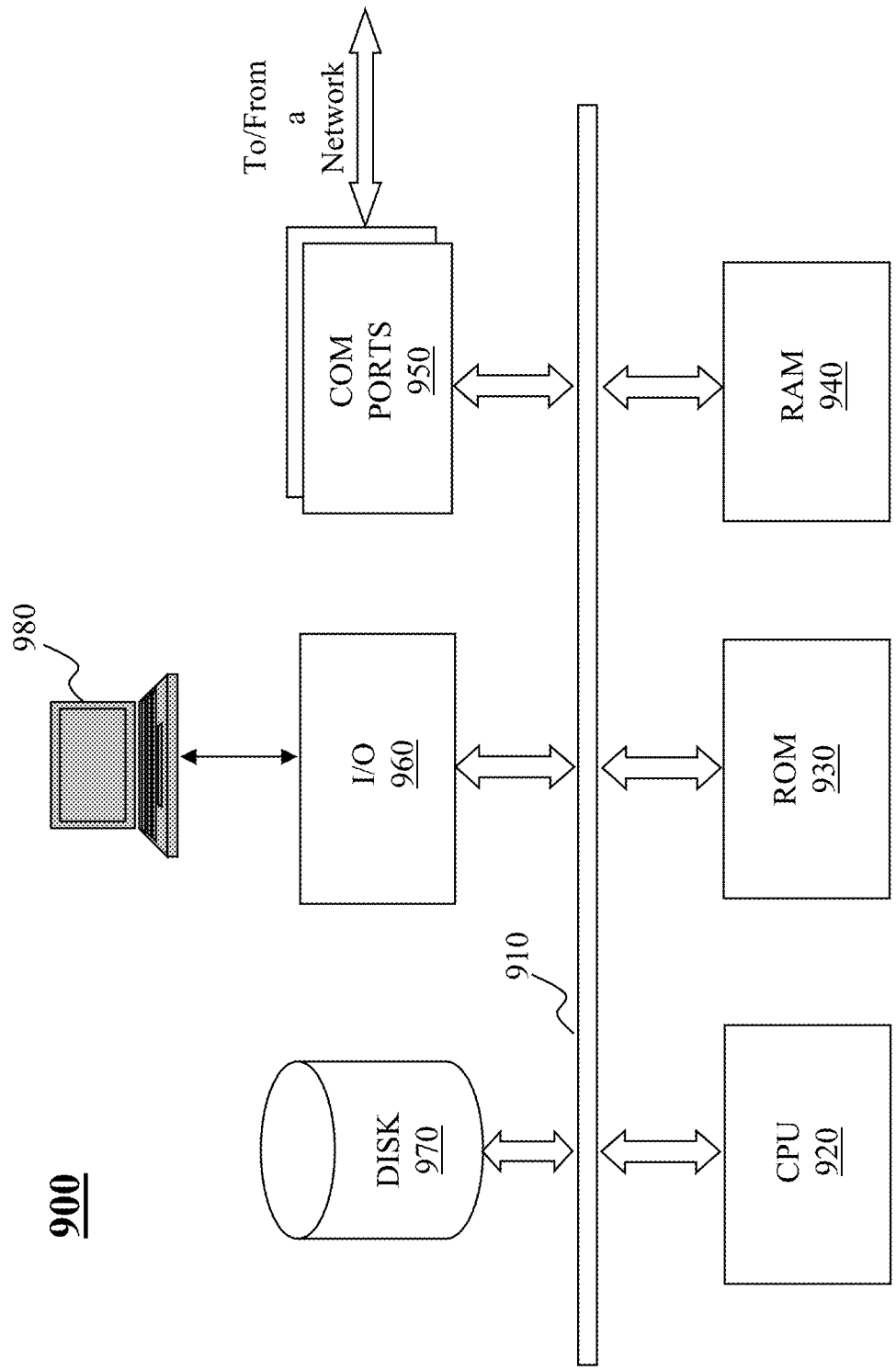
FIG. 9 is an illustrative diagram of an exemplary computing device architecture that may be used to realize a specialized system implementing the present teaching in accordance with various embodiments.

FIG. 9 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 900 may be used to implement any component or aspect of the framework as disclosed herein. For example, the information analytical and management method and system as disclosed herein may be implemented on a computer such as computer 900, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 900, for example, includes COM ports 950 connected to and from a network connected thereto to facilitate data communications. Computer 900 also includes a central processing unit (CPU) 920, in the form of one or more processors, for executing program instructions. The exemplary computer platform includes an internal communication bus 910, program storage and data storage of different forms (e.g., disk 970, read only memory (ROM) 930, or random-access memory (RAM) 940), for various data files to be processed and/or communicated by computer 900, as well as possibly program instructions to be executed by CPU 920. Computer 600 also includes an I/O component 960, supporting input/output flows between the computer and other components therein such as user interface elements 980. Computer 900 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform for product recommendation, comprising:
   receiving communication content from a plurality of service providers each operating on a respective one of a plurality of different platforms;
   identifying automatically, via machine learning, information related to a product mentioned on a webpage by:
      extracting an HTML link to a webpage included in the communication content,
      accessing the webpage using the extracted HTML link, wherein the webpage includes different contents organized in accordance with a specified structure including an HTML tree with a plurality of nodes, and
      extracting a name of the product using a product name classification model obtained via machine learning and a plurality of other pieces of information relevant to the product from the webpage based on the specified structure;
   identifying, based on machine-learned demographics/interests/platforms (DIP) targeting models, a plurality of targets associated with each of the one or more service providers as an intended targeted audience for a recommendation of the product;
   generating, for each of the plurality of different platforms, a corresponding recommendation of the product based on the information related to the product, wherein generating the corresponding recommendation of the product for each of the plurality of different platforms comprises including the extracted name of the product and a partial subset of the extracted plurality of other pieces of information relevant to the product in each corresponding recommendation of the product;
   formatting each recommendation of the product in a form appropriate with respect to the service provider on the corresponding platform;
   sending, to each of the plurality of service providers, the corresponding recommendation of the product with targeting instructions indicating the intended targeted audience for distributing the recommendation of the product to the intended targeted audience; and
   updating, based on user activities associated with the product received from the one or more service providers, the demographics/interests/platforms (DIP) targeting models.

2. The method of claim 1, wherein the communication content includes at least one of:
   an electronic mail involving a user;
   a short message associated with a user; and
   textual information presented in a chatroom with a group of users.

3. The method of claim 1, wherein the plurality of nodes include a root node, leave nodes, and intermediate nodes, wherein each of the intermediate nodes represents a sub-tree with nodes from the plurality of nodes originated from the intermediate node.

4. The method of claim 3, wherein the step of extracting the name of the product comprises:
   identifying one of the intermediate nodes in the HTML tree corresponding to a sub-tree including a single link therein;
   determining a link-based boundary within the webpage defined by the identified sub-tree;
   generating a plurality of phrases based on text of the webpage within the link-based boundary; and
   selecting one of the plurality of phrases as the name of the product via classification performed based on the product name classification model.

5. The method of claim 4, further comprising:
   filtering, prior to the step of selecting, the plurality of phrases to remove those phrases that are not corresponding to a name of a product; and
   obtaining additional information related to the product, wherein
   the additional information related to the product includes a visual presentation of the product and a hypertext link through which further information associated with the product can be retrieved, and
   the additional information is extracted from either the webpage within the link-based boundary or from content at another source linked via the hypertext link that is present on the webpage within the link-based boundary.

6. The method of claim 1, wherein the step of identifying the plurality of targets comprises:
   accessing the DIP targeting models created based on tracked information associated with users of the plurality of service providers operating on the plurality of platforms; and
   identifying, based on the DIP targeting models, the plurality of targets as intended targeted audience for the recommendation of the product with respect to each of the plurality of platforms, wherein
   the tracked information records activities of the users with respect to different types of information including previously generated product recommendations distributed thereto.

7. Machine readable and non-transitory medium having information recorded thereon for product recommendation, wherein the information, when read by a machine, causes the machine to perform following steps:
   receiving communication content from a plurality of service providers each operating on a respective one of a plurality of different platforms;
   identifying automatically, via machine learning, information related to a product mentioned on a webpage by:
      extracting an HTML link to a webpage included in the communication content,
      accessing the webpage using the extracted HTML link, wherein the webpage includes different contents organized in accordance with a specified structure including an HTML tree with a plurality of nodes, and
      extracting a name of the product using a product name classification model obtained via machine learning and a plurality of other pieces of information relevant to the product from the webpage based on the specified structure;
   identifying, based on machine-learned demographics/interests/platforms (DIP) targeting models, a plurality of targets associated with each of the one or more service providers as an intended targeted audience for a recommendation of the product;
   generating, for each of the plurality of different platforms, a corresponding recommendation of the product based on the information related to the product, wherein generating the corresponding recommendation of the product for each of the plurality of different platforms comprises including the extracted name of the product and a partial subset of the extracted plurality of other pieces of information relevant to the product in each corresponding recommendation of the product;

formatting each recommendation of the product in a form appropriate with respect to the service provider on the corresponding platform;

sending, to each of the plurality of service providers, the corresponding recommendation of the product with targeting instructions indicating the intended targeted audience for distributing the recommendation of the product to the intended targeted audience; and updating, based on user activities associated with the product received from the one or more service providers, the demographics/interests/platforms (DIP) targeting models.

8. The medium of claim 7, wherein the communication content includes at least one of:
an electronic mail involving a user;
a short message associated with a user; and
textual information presented in a chatroom with a group of users.

9. The medium of claim 7, wherein
the plurality of nodes include a root node, leave nodes, and intermediate nodes, wherein each of the intermediate nodes represents a sub-tree with nodes from the plurality of nodes originated from the intermediate node.

10. The medium of claim 9, wherein the step of extracting the name of the product comprises:
identifying one of the intermediate nodes in the HTML tree corresponding to a sub-tree including a single link therein;
determining a link-based boundary within the webpage defined by the identified sub-tree;
generating a plurality of phrases based on text of the webpage within the link-based boundary; and
selecting one of the plurality of phrases as the name of the product via classification performed based on the product name classification model.

11. The medium of claim 10, wherein the information, when read by the machine, further causes the machine to perform the following steps:
filtering, prior to the step of selecting, the plurality of phrases to remove those phrases that are not corresponding to a name of a product; and
obtaining additional information related to the product, wherein
the additional information related to the product includes a visual presentation of the product and a hypertext link through which further information associated with the product can be retrieved, and
the additional information is extracted from either the webpage within the link-based boundary or from content at another source linked via the hypertext link that is present on the webpage within the link-based boundary.

12. The medium of claim 7, wherein the step of identifying the plurality of targets comprises:
accessing the DIP targeting models created based on tracked information associated with users of the plurality of service providers operating on the plurality of platforms; and
identifying, based on the DIP targeting models, the plurality of targets as intended targeted audience for the recommendation of the product with respect to each of the plurality of platforms, wherein
the tracked information records activities of the users with respect to different types of information including previously generated product recommendations distributed thereto.

13. A system for product recommendation, comprising:
a product recommendation generator implemented by a processor and configured for
receiving communication content from a plurality of service providers each operating on a corresponding respective one of a plurality of different platforms;
identifying automatically, via machine learning, information related to a product mentioned on a webpage by:
extracting an HTML link to a webpage included in the communication content,
accessing the webpage using the extracted HTML link, wherein the webpage includes different contents organized in accordance with a specified structure including an HTML tree with a plurality of nodes, and
extracting a name of the product using a product name classification model obtained via machine learning and a plurality of other pieces of information relevant to the product from the webpage based on the specified structure;
identifying, based on machine-learned demographics/interests/platforms (DIP) targeting models, a plurality of targets associated with each of the one or more service providers as an intended targeted audience for a recommendation of the product; and
generating, for each of the plurality of different platforms, a corresponding recommendation of the product based on the information related to the product, wherein generating the corresponding recommendation of the product for each of the plurality of different platforms comprises including the extracted name of the product and a partial subset of the extracted plurality of other pieces of information relevant to the product in each corresponding recommendation of the product; and
a recommendation card distribution engine implemented by a processor and configured for
formatting each recommendation of the product in a form appropriate with respect to the service provider on the corresponding platform;
sending, to each of the plurality of service providers, the corresponding recommendation of the product with targeting instructions indicating the intended targeted audience for distributing the recommendation of the product to the intended targeted audience; and
updating, based on user activities associated with the product received from the one or more service providers, the demographics/interests/platforms (DIP) targeting models.

14. The system of claim 13, wherein the communication content includes at least one of:
an electronic mail involving a user;
a short message associated with a user; and
textual information presented in a chatroom with a group of users.

15. The system of claim 13, wherein
the plurality of nodes include a root node, leave nodes, and intermediate nodes, wherein each of the intermediate nodes represents a sub-tree with nodes from the plurality of nodes originated from the intermediate node.

16. The system of claim 15, wherein the step of extracting the name of the product comprises:

identifying one of the intermediate nodes in the HTML tree corresponding to a sub-tree including a single link therein;

determining a link-based boundary within the webpage defined by the identified sub-tree;

generating a plurality of phrases based on text of the webpage within the link-based boundary; and selecting one of the plurality of phrases as the name of the product via classification performed based on the product name classification model.

17. The method of claim 16, further comprising:

filtering, prior to the step of selecting, the plurality of phrases to remove those phrases that are not corresponding to a name of a product; and obtaining additional information related to the product, wherein the additional information related to the product includes a visual presentation of the product and a hypertext link through which further information associated with the product can be retrieved, and the additional information is extracted from either the webpage within the link-based boundary or from content at another source linked via the hypertext link that is present on the webpage within the link-based boundary.

* * * * *